(12) United States Patent
Mao et al.

(10) Patent No.: US 8,954,438 B1
(45) Date of Patent: Feb. 10, 2015

(54) STRUCTURED METADATA EXTRACTION

(75) Inventors: Yiqiang Mao, Shanghai (CN); Alvin Tang, Shanghai (CN); Nitin Khandelwal, Mountain View, CA (US)

(73) Assignee: Google Inc., Mountain View, CA (US)

( * ) Notice: Subject to any disclaimer, the term of this patent is extended or adjusted under 35 U.S.C. 154(b) by 33 days.

(21) Appl. No.: 13/484,803

(22) Filed: May 31, 2012

(51) Int. Cl.
*G06F 17/30* (2006.01)

(52) U.S. Cl.
USPC .......................................... 707/737; 707/776

(58) Field of Classification Search
USPC ................................................. 707/737, 776
See application file for complete search history.

(56) References Cited

U.S. PATENT DOCUMENTS

| | | | |
|---|---|---|---|
| 5,666,502 A | 9/1997 | Capps | |
| 5,946,647 A | 8/1999 | Miller et al. | |
| 6,513,036 B2 | 1/2003 | Fruensgaard et al. | |
| 6,832,218 B1 | 12/2004 | Emens et al. | |
| 6,847,959 B1 | 1/2005 | Arrouye et al. | |
| 6,944,612 B2 | 9/2005 | Roustant et al. | |
| 7,562,076 B2 | 7/2009 | Kapur | |
| 7,565,139 B2 | 7/2009 | Neven, Sr. et al. | |
| 7,761,414 B2 | 7/2010 | Freedman | |
| 7,818,324 B1 | 10/2010 | Held et al. | |
| 7,895,196 B2 | 2/2011 | Mahadevan et al. | |
| 7,933,900 B2 | 4/2011 | Reddy et al. | |
| 8,005,720 B2 | 8/2011 | King et al. | |
| 8,086,604 B2 | 12/2011 | Arrouye et al. | |
| 8,285,595 B2* | 10/2012 | Svendsen ..................... | 705/26.1 |
| 8,286,885 B1 | 10/2012 | Zehr et al. | |
| 8,316,029 B2 | 11/2012 | Lawrence | |
| 8,538,989 B1* | 9/2013 | Datar et al. ................... | 707/780 |
| 2002/0083039 A1 | 6/2002 | Ferrari et al. | |
| 2004/0093321 A1 | 5/2004 | Roustant et al. | |
| 2006/0026147 A1 | 2/2006 | Cone et al. | |
| 2007/0083497 A1* | 4/2007 | Martinez ........................... | 707/3 |
| 2007/0260594 A1 | 11/2007 | Lewak et al. | |
| 2008/0010273 A1 | 1/2008 | Frank | |
| 2008/0126143 A1 | 5/2008 | Altman et al. | |
| 2009/0063500 A1* | 3/2009 | Zhai et al. ....................... | 707/10 |
| 2009/0224867 A1 | 9/2009 | O'Shaughnessy et al. | |

(Continued)

FOREIGN PATENT DOCUMENTS

| | | |
|---|---|---|
| CN | 101341464 A | 1/2009 |
| WO | WO 0131479 | 5/2001 |

(Continued)

OTHER PUBLICATIONS

Marie-Catherine De Marneffe, Christopher D. Manning, "Stanford Typed Dependencies Manual," Sep. 2011, 24 pages.

(Continued)

*Primary Examiner* — Robert Beausoliel, Jr.
*Assistant Examiner* — Bao Tran
(74) *Attorney, Agent, or Firm* — Fish & Richardson P.C.

(57) ABSTRACT

Structured metadata extraction may include accessing one or more documents from which to extract the structured metadata from each of a plurality of hosts. A plurality of entity names can be extracted from the one or more documents from one of the plurality of hosts using an entity name pattern. A first element list can be extracted from the one or more documents based at least in part on the plurality of entity names and based at least in part on one or more heuristic rules. An element list pattern may be generated based at least in part on the first element list, and a second element list may be extracted from the one or more documents based at least in part on the element list pattern.

16 Claims, 7 Drawing Sheets

(56) References Cited

U.S. PATENT DOCUMENTS

| | | | |
|---|---|---|---|
| 2010/0057694 A1* | 3/2010 | Kunjithapatham et al. | 707/3 |
| 2010/0070448 A1 | 3/2010 | Omoigui | |
| 2010/0241416 A1* | 9/2010 | Jiang et al. | 704/7 |
| 2011/0137883 A1 | 6/2011 | Lagad et al. | |
| 2011/0184981 A1 | 7/2011 | Lu et al. | |
| 2011/0202493 A1 | 8/2011 | Li | |
| 2012/0101858 A1 | 4/2012 | Depasquale et al. | |
| 2012/0101901 A1 | 4/2012 | Depasquale et al. | |
| 2012/0150572 A1 | 6/2012 | Fredericks et al. | |
| 2012/0246153 A1 | 9/2012 | Pehle | |
| 2012/0330906 A1 | 12/2012 | Fredericks et al. | |
| 2013/0054542 A1 | 2/2013 | Ollenberger et al. | |
| 2013/0110833 A1 | 5/2013 | Fredericks et al. | |
| 2013/0232147 A1* | 9/2013 | Mehra et al. | 707/737 |
| 2013/0268314 A1* | 10/2013 | Kandogan et al. | 705/7.29 |

FOREIGN PATENT DOCUMENTS

| | | |
|---|---|---|
| WO | WO 2006110480 | 10/2006 |
| WO | WO 2010120925 | 10/2010 |

OTHER PUBLICATIONS

Kao, Wayne, "Telling the Story of Friendships," Facebook, Oct. 28, 2010, available at http://blog.facebook.com/blog.php-?post=443390892130, pp. 1-2.

Dekang Lin, "Dependency-based Evaluation of Minipar," In Workshop on the Evaluation of Parsing Systems, May 1, 1998, 14 pages, Granada, Spain.

Rion Snow, Daniel Jurafsky, Andrew Y. Ng, "Learning Syntactic Patterns for Automatic Hypernym Discovery," 2011, 8 pages.

Veselin Stoyanov, Claire Cardie, Nathan Gilbert, Ellen Riloff, David Buttler, David Hysom, "Reconcile: A Coreference Resolution Research Platform," May 13, 2010, 14 pages.

TRIPIT, "Announcing TripIt—The First Intelligent Travel Organizer for Do-It-Yourself Trip Planners," Concur Technologies Inc., Sep. 18, 2007, available at http://www.tripit.com/press/company-announcements/announcing-tripit-first-intelligent-travel-organizer-do-it-yourself-trip, pp. 1-2.

\* cited by examiner

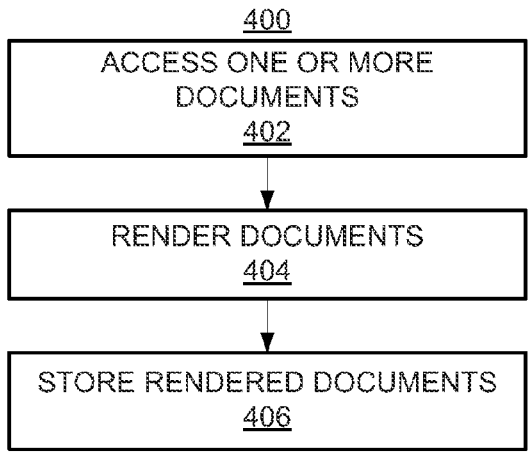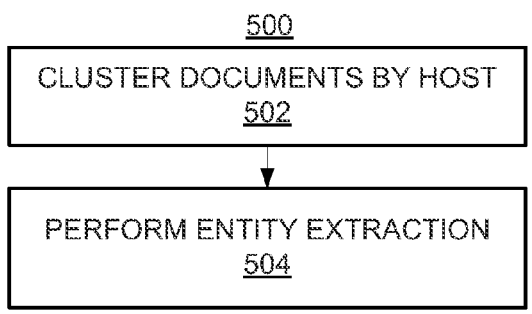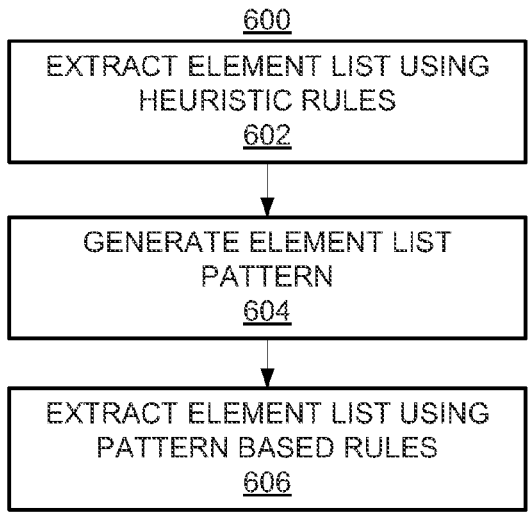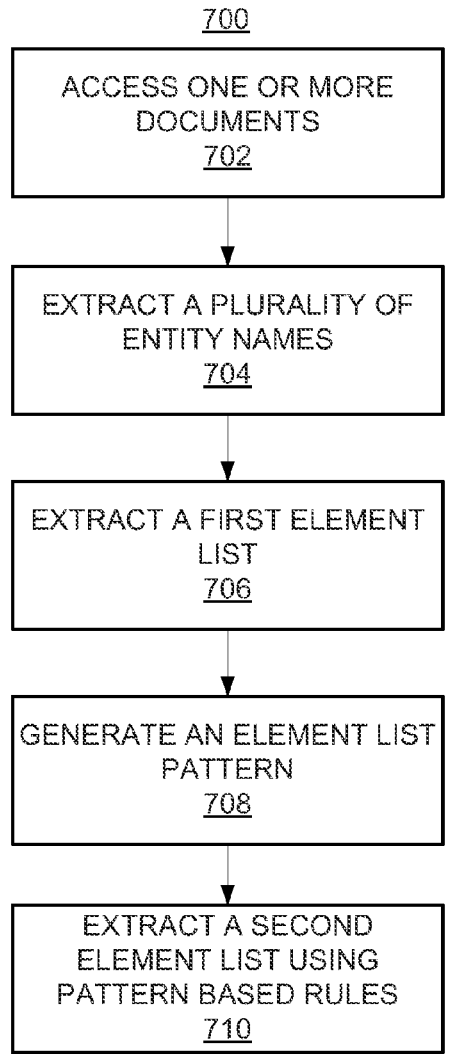

US 8,954,438 B1

STRUCTURED METADATA EXTRACTION

BACKGROUND

This specification relates to extracting structured metadata. Many web sites provide access to structured data. For example, some websites compile information about different episodes of television shows in a structured format. Compiling a list of episodes can be accomplished by accessing this stored data and organizing it accordingly. However, because different websites use different formats, extracting desired data has been accomplished by manual techniques.

SUMMARY

A method may include accessing one or more documents from which to extract the structured metadata from each of a plurality of hosts, extracting a plurality of entity names from the one or more documents from one of the plurality of hosts using an entity name pattern, extracting a first element list from the one or more documents based at least in part on the plurality of entity names and based at least in part on one or more heuristic rules, generating an element list pattern based at least in part on the first element list, and extracting a second element list from the one or more documents based at least in part on the element list pattern.

A system may include one or more computers configured to access one or more documents from which to extract the structured metadata from each of a plurality of hosts, extract a plurality of entity names from the one or more documents from one of the plurality of hosts using an entity name pattern, extract a first element list from one or more documents based at least in part on the plurality of entity names and based at least in part on one or more heuristic rules, generate an element list pattern based at least in part on the first element list, and extract a second element list from the one or more documents based at least in part on the element list pattern.

Some technical advantages of the disclosed techniques include discovering structured metadata from one or more documents, improving the accuracy of element lists using cross-validation, increasing the number of available element lists, automating the extraction of structured metadata, and reducing computational requirements to extract element lists.

BRIEF DESCRIPTION OF THE FIGURES

The above and other features of the present disclosure, its nature and various advantages will be more apparent upon consideration of the following detailed description, taken in conjunction with the accompanying drawings in which:

FIG. 4 is a flow diagram of illustrative steps for rendering and storing web pages, in accordance with some implementations;

FIG. 5 is a flow diagram of illustrative steps for extracting an entity name, in accordance with some implementations;

FIG. 6 is a flow diagram of illustrative steps for extracting element lists, in accordance with some implementations;

FIG. 7 is a flow diagram of illustrative steps for extracting element lists using heuristic rules and patterns, in accordance with some implementations;

DETAILED DESCRIPTION OF THE FIGURES

Figure 1:
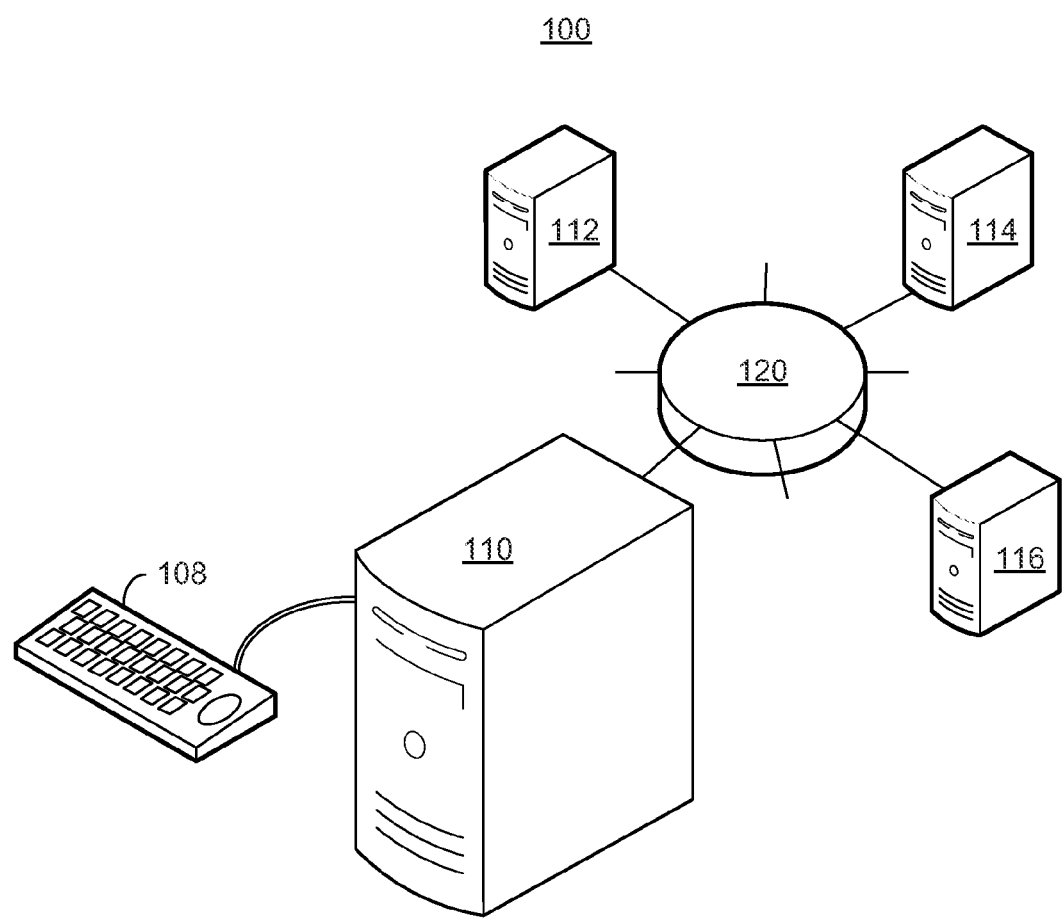
FIG. 1 is a block diagram of an illustrative arrangement for extracting structured metadata, in accordance with some implementations.

The present disclosure is directed towards extracting structured metadata from a document such as a web document. An element list for an entity, such as an episode list for a television program or a song list for a particular musical artist, can be extracted from a document. An element list can be generated by locating elements in a document. Documents, which may include web pages, video files, or other documents, can be stored in a database, and clustered by host.

For example, an element list can be extracted from one or more documents based on heuristics or a pattern. One or more documents such as, for example, web pages having particular uniform resource locators (URLs) can include metadata relating to one or more entities. The metadata can include structured information relating to entities. An entity can be, for example, a television program, a music album, any other suitable media item or series thereof, or any combination thereof. An entity can have one or more associated elements such as, for example, an episode, a song, any other suitable element associated with an entity, or any combination thereof. Elements for a particular entity can be clustered and referred to collectively as an element list. Element lists can include element groups, which can include, for example, seasons of episodes, collections of songs, any other suitable categorization of elements, or any combination thereof.

Extraction of structured metadata associated with an entity can include several steps. For example, a pre-defined URL pattern can be used to access web documents. The web documents, which may be composed in hypertext markup language (HTML), can be rendered and stored. Multiple web pages can be stored, for one or more languages, in order to cross-validate elements. A URL pattern may be inputted by a user, for example, based on an expected URL address form for a particular host. A known or determined entity name pattern may be used to extract the entity name, and may depend on the particular web page, entity name, or both. An entity name may be extracted from a web page, for example, by accessing a title tag. For example, the entity name pattern ""(.*)"\(\d+\)-Episode List" is used to extract the entity name for the television show "Family Guy" from a particular title tag such as ""Family Guy" (1999)-Episode List". Similar or different entity name patterns, per entity and/or host, can be used to extract an entity name from each web page title. Web page titles can be clustered by host, and then an entity name is extracted from each web page title.

An element list for an entity can be extracted from a corresponding web page using a set of heuristic rules, one or more element list patterns, or both. For example, a set of heuristic rules can be used to extract an initial element list. The element list can be validated against a reference element list extracted from another host. For example, element lists from multiple web pages can be compared, and items included in more than one element list can be validated. An element list pattern can be generated based on the initial element list, and a pattern-based extraction can be used to extract a second element list. The pattern generation can be, for example, defined by a document object model (DOM) tree path from a document root node to an element node. More than one element list pattern can be aggregated for, for example, multiple hosts.

FIG. 1 is a block diagram of an illustrative system 100 for extracting structured metadata, in accordance with some implementations of the present disclosure. The illustrative system 100, as shown in FIG. 1, includes a server 110, having processing equipment, one or more web servers 112, 114, and 116 storing web documents, and a network 120 communicatively coupling the server 110 and the one or more web servers 112, 114, and 116.

In some implementations, server 110 includes processing equipment such as, for example, a processor such as a central processing unit, cache, memory such as suitable volatile and/or non-volatile memory, one or more buses such as any suitable serial bus and/or parallel bus, any other suitable components, or any combination thereof. For example, server 110 can include a central processing unit, which can include one or more microprocessors. In a further example, server 110 can include random access memory (RAM), read-only memory (ROM), flash memory, magnetic memory storage devices such as hard disks. In a further example, server 110 can include one or more system buses including control buses, data buses, and or address buses, which are be configured to allow communication between a processor, memory, external devices, any other suitable devices and networks, or any combination thereof. In some implementations, server 110 includes one or more communication interfaces, configured to transmit and/or receive information with other systems, devices, and/or networks.

In some implementations, the one or more web servers 112, 114, and 116 each include memory storage configured to store web documents, media items, any other suitable information, or any combination thereof. In some implementations, server 110 can be communicatively coupled to any or all of web servers 112, 114, and 116, any other suitable device, or any combination thereof, via network 120. In some implementations, network 120 can include several network scales such as, for example, a local area network (LAN), a wide area network (WAN), or other network, which may be wired, wireless, optical, or any combination thereof. For example, server 110 and web servers 112, 114, and 116 can communicate using an internet protocol such as transmission control protocol and internet protocol (TCP/IP). In some implementations, server 100 can be configured to pull information from one or more of web servers 112, 114, and 116. In some implementations, one or more of web servers 112, 114, and 116 can be configured to push information to server 110. In some implementations, server 110 can be configured as a client, and one or more of web servers 112, 114, and 116 can be configured as a host. Server 110 and web servers 112, 114, and 116 can use any suitable communications protocol including, for example, Ethernet such as IEEE 802.11 wireless LAN, TCP/IP, or other protocol to receive, transmit, or otherwise exchange information.

In some implementations, server 110 includes user input device 108, configured to receive user input. Accordingly, in some implementations, server 110 can include a user interface, having a display screen, a touchscreen, a keyboard, a mouse, an audio output device such as a speaker, an audio input device such as a microphone, any other suitable hardware or software, or any combination thereof.

Figure 2:
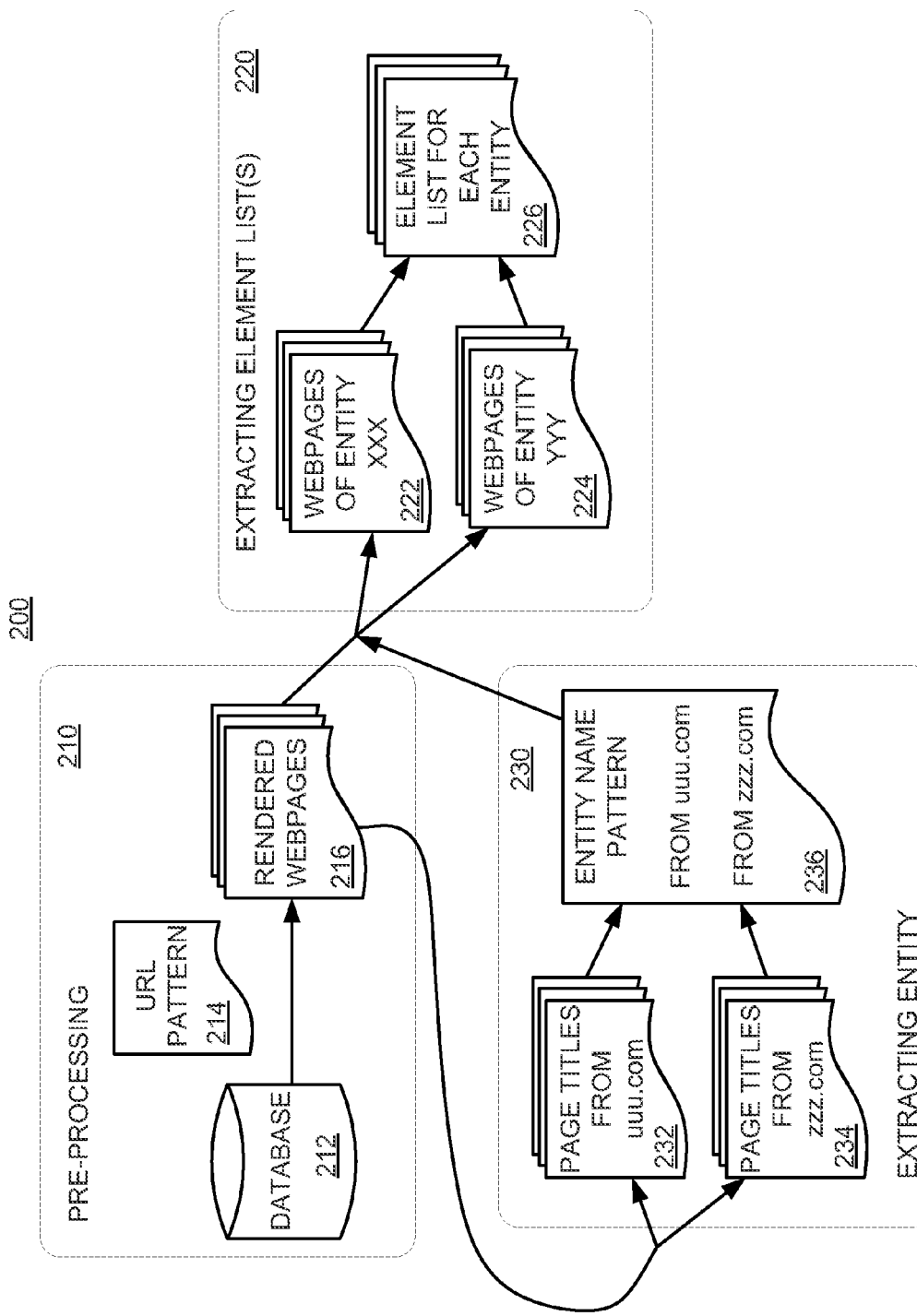
FIG. 2 is a block diagram of an illustrative process flow that may be used for extracting structured metadata, in accordance with some implementations.

FIG. 2 is a block diagram of an illustrative process flow 200 that can be used for extracting structured metadata, in accordance with some implementations of the present disclosure. In some implementations, process flow 200 can be implemented using the illustrative system 100 of FIG. 1.

In some implementations, process flow 200 allows server 110 to extract structured metadata. In some implementations, server 110 may perform pre-processing 210. During pre-processing 210, server 110 can use database 212 to collect and store web documents. For example, server 110 can use a uniform resource locator (URL) pattern 214 to access one or more web pages, which may be stored in any of web servers 112, 114, and 116. Server 110 can render the one or more web pages, and store the rendered web pages 216 in suitable memory.

In some implementations, server 110 extracts entities as illustrated by block 230 to determine an entity name pattern, which can then be used, for example, when extracting element lists in block 220. In some implementations, server 110 can extract an entity name pattern from one or more of rendered web pages 216. For example, server 110 can cluster rendered web pages 216 by host using web server, domain name, or URL, as shown by Page Titles From uuu.com 232 and Page Titles From zzz.com 234. For each host, server 110 can use an entity name determined using an entity name pattern 236 to further cluster the rendered web pages by entity name. In some implementations, one or more components of rendered web pages 216 of a particular host follow a particular pattern. For example, a particular host may use title tags of the format "Watch XXX-tv.com" and "Watch YYY-tv.com". Server 110 detects the common prefix ("Watch") and suffix ("-tv.com"), and uses the pattern "PREFIX(.*)SUFFIX" to distill "XXX" or "YYY" from the title tag. Server 110 can use different patterns for each host, depending on the particular format. Server 110 can use any suitable pattern extraction, heuristic rules, and/or assumptions to extract an entity name from one or more rendered web pages 216. In some implementations, entity names or entity name patterns 236 are provided to block 220 for generating an element list for that entity.

In some implementations, server 110 extracts one or more element lists as illustrated by block 220 using rendered web pages 216. In some implementations, server 110 can cluster one or more of the rendered web pages 216 by entity name. For example, as illustrated in FIG. 2, server 110 clusters web pages of entity XXX 222, e.g., which can be a particular television program, or other type of entity, and web pages of entity YYY 224, e.g., which can be a particular television program other than entity XXX, or other type of entity. Server 110 generates one or more element lists 226, corresponding to each of the entities XXX and YYY.

Figure 3:
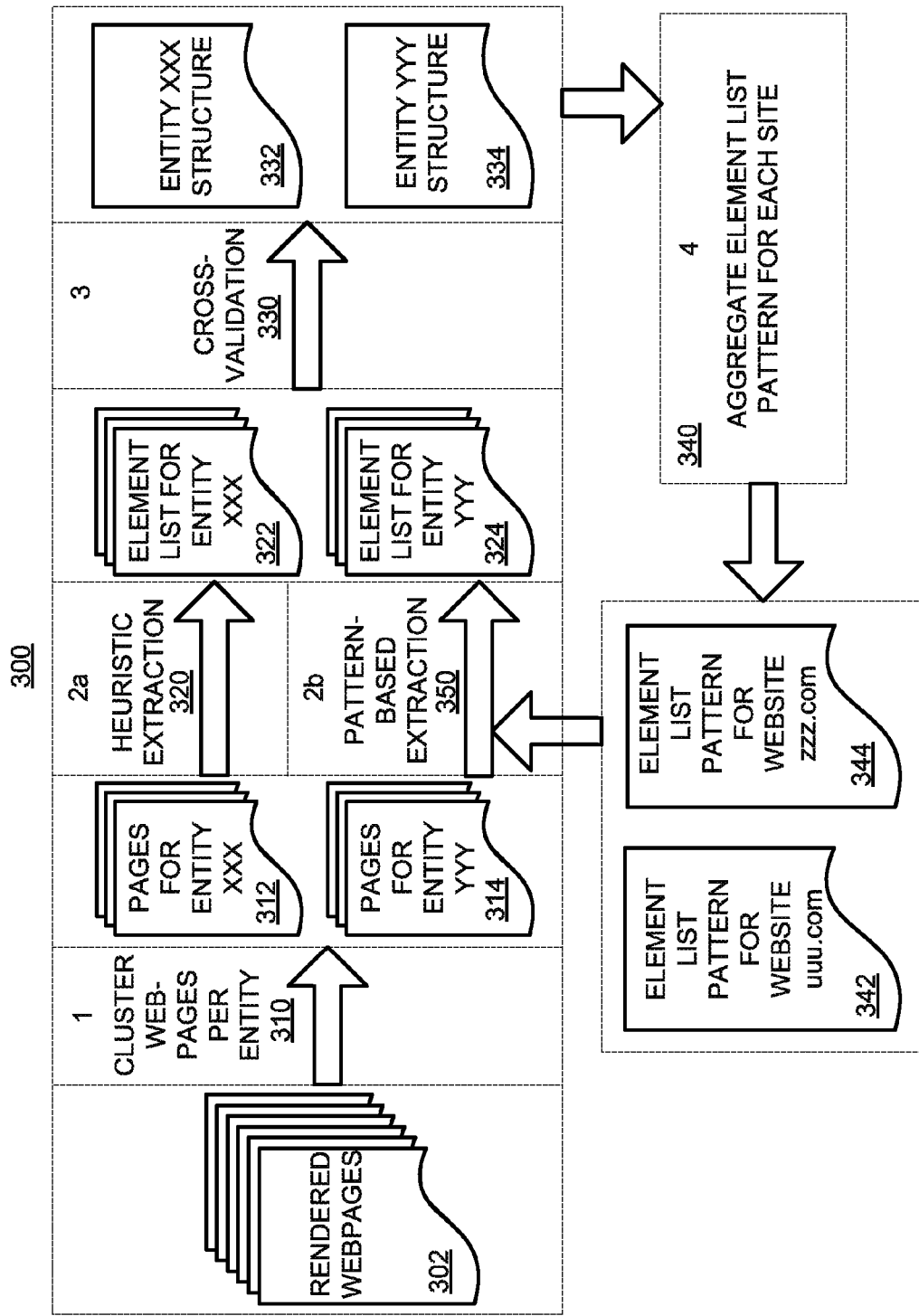
FIG. 3 is a block diagram of an illustrative process flow for extracting structured metadata using heuristic rule-based extraction and patterns-based extraction, in accordance with some implementations.

FIG. 3 is a block diagram of an illustrative process flow 300 for extracting structured metadata using heuristic rule-based extraction and patterns-based extraction, in accordance with some implementations of the present disclosure. In some implementations, process flow 300 can be implemented by server 110 as part of process flow 200. The illustrative steps of process flow 300 can be performed for rendered web pages from a single host, or from multiple hosts.

In some implementations, server 110 stores one or more rendered web pages 302. Step 310 can include server 110 clustering rendered web pages, or a subset thereof, by entity. For example, server 110 can use an entity name pattern to distinguish, sort and cluster web pages for entity XXX 312, web pages for entity YYY 314, and web pages for any other suitable entities, of rendered web pages 302 by entity name.

In some implementations, server 110 extracts an element list for entity XXX 322, an element list for entity YYY 324, an element list for any other suitable entity, or any combination thereof, using heuristic extraction 320, pattern-based extraction 350, or both. For example, server 110 can perform heuristic extraction 320, pattern-based extraction 350, or both, to clustered web pages 312 and 314 of step 310. An element list, e.g., an element list for entity XXX 322 or an element list for entity YYY 324, can include one or more elements, e.g., episodes, songs, or other elements, one or more groups of elements, e.g., season of episodes, collection of songs, or other groupings, any other suitable information, or any combination thereof.

In some implementations, server 110 performs cross-validation 330 for the element list for entity XXX 322, the element list for entity YYY 324, any other suitable element list, or any combination thereof. Server 110 can cross-validate an element list, for a particular entity, from a particular host with an element list, for the same entity, from one or more other hosts. For example, server 110 can compare the element list for entity XXX 322, derived from host zzz.com, with another element list for entity XXX from another host uuu.com. Cross-validation aids in preventing errors, inconsistencies, and/or low confidence in the generated element list for an entity. For example, if an episode IX of entity XXX is determined to appear in more than one element list from more than one source during cross-validation 330, then the confidence that episode IX is a valid episode is relatively increased. In some implementations, server 110 organizes validated elements into an entity data structure such as, for example, entity XXX structure 332, entity YYY structure 334, any other suitable data structure, or any combination thereof.

In some implementations, server 110 performs aggregation 340 of element list patterns for each host, e.g., website. In some implementations, server 110 may generate an element list pattern for website uuu.com 342, an element list pattern for website zzz.com 344, an element list pattern for any other suitable host, or any combination thereof, and aggregate the generated element list patterns. In some implementations, server 110 determines an element node pattern for each host. For example, server 110 can find a DOM tree path from a document root node, e.g., a <html> node, to an element node, e.g., a <div> node containing the element. In some implementations server 110 performs aggregation 340 when cross-validation 330 passes successfully, e.g., each element appears in more than one element list. In some implementations, where cross-validation 330 fails, server 110 need not perform aggregation 340.

In some implementations, server 110 performs the illustrative steps of process flow 300 in a particular order. For example, server 110 can perform a first run by performing, in order, steps 310, 320, 330, and 340. Server 110 can then perform a second run by performing, in order, steps 310, 350, and 330, based at least in part on the first run.

FIG. 4 is a flow diagram 400 of illustrative steps for rendering and storing web pages, in accordance with some implementations of the present disclosure.

Step 402 includes server 110 identifying one or more documents. In some implementations, the one or more documents can include web pages, web documents, any other suitable documents, or any combination thereof. For example, documents may include HTML documents, extensible markup language (XML) documents, video files, audio files, any other suitable documents, or any combination thereof. In some implementations, server 110 performs a search for one or more documents using one or more keywords, URLs, any other suitable information, or any combination thereof. In some implementations, server 110 receives one or more user inputs identifying the one or more documents. In some implementations, server 110 uses a URL pattern to retrieve the one or more documents. For example, server 110 can use the URL pattern "regexp:^http://www\.wmdb\.com/title/tt\+d/episodes$" as a pattern to locate web pages exhibiting an episode list for an entity with a particular title at web page www.wmdb.com. A URL pattern can be inputted manually by a user using an input interface, stored in suitable memory of server 110, determined automatically by processing equipment of server 110, determined using any other technique, or any combination thereof. In some implementations, server 110 uses more than one URL pattern, each corresponding to a particular language, e.g., English, Spanish, French, Mandarin. In some implementations, server 110 uses more than one URL pattern per language (e.g., corresponding to more than one document).

Step 404 includes server 110 rendering the one or more documents identified at step 402. In some implementations, rendering a document may include applying one or more templates to the documents. For example, server 110 can use an HTML template to render one or more web pages.

Step 406 includes server 110 storing the one or more rendered documents of step 404 in suitable memory. In some implementations, server 110 stores the one or more rendered documents in memory as part of a database. The memory can be local to server 110, remote to server 110, or a combination thereof.

FIG. 5 is a flow diagram 500 of illustrative steps for extracting an entity name, in accordance with some implementations of the present disclosure.

Step 502 includes server 110 clustering one or more documents by host. In some implementations, server 110 sorts the one or more documents by host. For example, server 110 can sort the one or more documents based on the URL pattern used to retrieve the one or more documents. Clustering documents by host aids server 110 in extracting an entity using a pattern unique to each host, generating an element list for each host, and/or validating the element list against an element list derived from a different host. For example, server 110 can cluster one or more web pages for host uuu.com and one or more web pages for host zzz.com. Accordingly, server 110 can perform further processing on the web pages for each host separately, and then compare the resulting element lists during validation. In some implementations, the one or more documents are stored separately in separate memory devices or in separate databases, for each host, retrieved in series by host, or otherwise be already partitioned by host, and accordingly server 110 need not perform step 502.

Step 504 includes server 110 performing entity extraction for the one or more clustered documents of step 502. In some implementations, server 110 extracts an entity name from the one or more documents using a title tag. In some implementations, server 110 uses an entity name pattern to perform the extraction. In some such implementations, server 110 uses a particular entity name pattern for a particular host. For example, for a particular host, server 110 can use the pattern ""(.*)"\(\d+\)-Episode List" to extract the entity name for a television show (e.g., in which the * character represents the entity name, and \d+\ represents a date) from a particular title such as ""Family Guy" (1999)-Episode List". In some implementations, the entity name pattern can take the form "PREFIX(.*)SUFFIX" to distill an entity name from a web page, especially when the same PREFIX and SUFFIX are used by the host for multiple entities. The entity name pattern can be inputted manually by a user using an input interface, stored in suitable memory of server 110, determined automatically by processing equipment of server 110, determined using any other technique, or any combination thereof.

FIG. 6 is a flow diagram 600 of illustrative steps for extracting element lists, in accordance with some implementations of the present disclosure.

Step 602 includes server 110 extracting an element list using one or more heuristic rules. A heuristic rule may include, for example, a user-specified pattern for extracting an element list, an automatically-generated, e.g., by server 110, pattern for extracting an element list, or both. In some implementations, a rendered web page can include a list of episodes of a particular television program. For example, a user can specify a DOM tree path to element nodes for particular episodes of the television program based on where the element nodes would be expected to be arranged. In a further example, a heuristic rule can include searching in a "list" object, text having a large font size at the top of a web page, and/or other rules. In some implementations, server 110 generates an element list by extracting and collecting an identifier for each episode such as an episode title or episode season/number. In a further example, in some implementations, server 110 can store a rendered web page corresponding to each episode of a particular television program, the web page include information about that particular episode. Server 110 can search for a title node for each rendered web page using, for example, a pre-determined keyword search or other approach such as finding a font size, and generate an element list by gathering an identifier for each episode from each web page.

Step 604 includes server 110 generating an element list pattern based at least in part on the element list of step 602. In some implementations, the element list pattern generation may be, for example, defined by a DOM tree path from a document root node to an element node. For example, the element list can be derived from a rendered web page, which has been rendered using an HTML template, e.g., during step 404 of flow diagram 400. In some circumstances, the DOM tree path can be the same for the web pages of different entities for a particular host. In some implementations, server 110 also extracts an element title from element node text. For example, server 110 can extract the episode title "Death has a shadow" from the element node text "Season 1 episode 1: Death has a shadow." In some implementations, server 110 aggregates a collection of multiple element list patterns for an entity generated for each of multiple hosts.

Step 606 includes server 110 extracting an element list using one or more pattern-based rules. In some implementations, the one or more pattern-based rules are based at least in part on the element list pattern of step 604. For example, server 110 can determine a particular element list pattern for a particular host. The element list pattern can include a tree path for particular element nodes. In some implementations, server 110 uses a DOM tree path determined at step 604 to determine each element of an element list.

Figure 8:
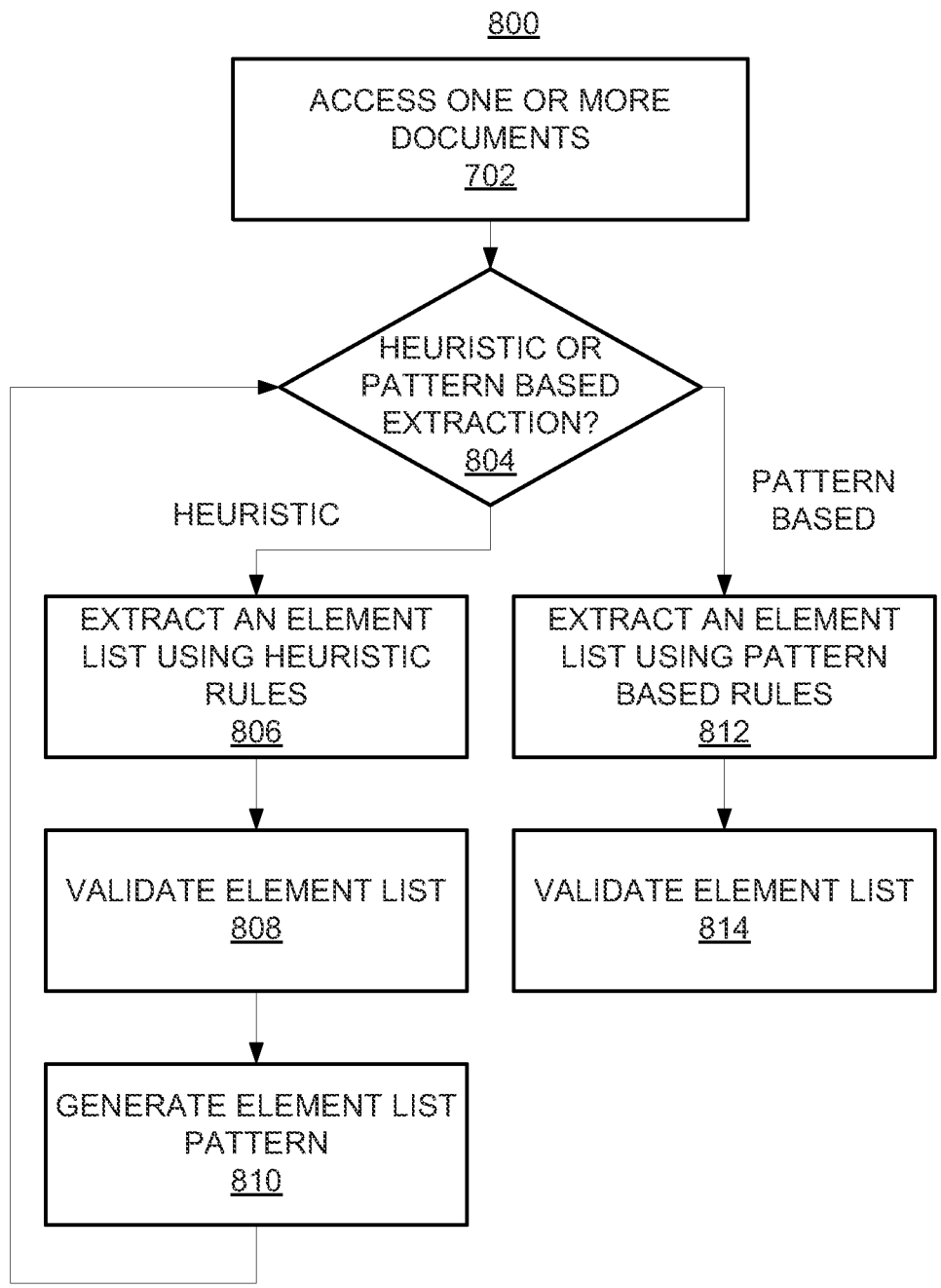
FIG. 8 is a flow diagram of illustrative steps for extracting element lists using heuristic rules and/or patterns, in accordance with some implementations.

FIGS. 7 and 8 are flow diagrams 700 and 800, respectively, of illustrative steps for extracting element lists using heuristic rules and patterns, in accordance with some implementations of the present disclosure.

Step 702 includes server 110 accessing one or more documents from which to extract structured metadata from each of a plurality of hosts, for one or more entities. In some implementations, server 110 accesses the one or more documents from a database. In some implementations, server 110 sorts and clusters the one or more documents by host. For example, server 110 can sort the one or more documents based on the URL pattern used to retrieve the one or more documents. In some implementations, the one or more documents are stored separately in separate memory devices or in separate databases for each host, retrieved in series by host, or otherwise be already partitioned by host, and accordingly server 110 need not perform step 702.

Step 704 includes server 110 extracting a plurality of entity names from the one or more documents of step 702. In some implementations, server 110 uses an entity name pattern to extract the entity name from the one or more documents. For example, server 110 may locate a title tag in a web document, and apply an entity name pattern to extract an entity name from the web document.

Step 706 includes server 110 extracting a first element list using one or more heuristic rules. Heuristic rules can include, for example, user-specified patterns for extracting an element list, automatically-generated patterns for extracting an element list, or both. For example, in some implementations, a rendered web page can include a list of episodes of a particular television program. A user can specify a DOM tree path to element nodes for particular episodes of the television program. Accordingly, server 110 can generate an element list by extracting and collecting an identifier for each episode such as an episode title or episode season/number). In a further example, in some implementations, server 110 stores a rendered web page corresponding to each episode of a particular television program, the web page include information about that particular episode. Server 110 can search for a title node for each rendered web page using, for example, a pre-determined keyword search or other heuristic approach, and generate an element list by gathering an identifier for each episode from each web page. For example, server 110 can use an episode title of a television show as an identifier.

Step 708 includes server 110 generating an element list pattern based at least in part on the first element list. In some implementations, the element list pattern generation can be, for example, defined by a DOM tree path from a document root node to an element node. For example, the element list can be derived from a rendered web page, which has been rendered using an HTML template, e.g., during step 404 of flow diagram 400. In some circumstances, the DOM tree path can be the same for the web pages of different entities for a particular host. In some implementations, server 110 also extracts an element title from element node text. For example, server 110 can extract the episode title "Death has a shadow" from the element node text "Season 1 episode 1: Death has a shadow." In some implementations, server 110 aggregates multiple element list patters generated, for example, for multiple hosts.

Step 710 includes server 110 extracting a second element list using one or more pattern-based rules. In some implementations, the one or more pattern-based rules can be based at least in part on the element list pattern of step 708. In some implementations, the one or more pattern-based rules can be based at least in part on the element list pattern of step 604. For example, server 110 can determine a particular element list pattern for a particular host. The element list pattern can include a tree path for particular element nodes. In some implementations, server 110 uses a DOM tree path determined at step 604 to determine each element of an element list. For example, an element can have a tag path such as "<html><body><li><ul><div>". This tag path describes a path in a DOM tree describing an html document, in which <body> refers to the body tag, <li> refers to a list tag, <ul> specifies that the list is unordered, and <div> specifies a section of the body containing the unordered list.

FIG. 8 is a flow diagram 800 of illustrative steps for extracting element lists using heuristic rules and/or patterns, in accordance with some implementations of the present disclosure.

Step 804 includes server 110 determining whether to use one or more heuristic rules or one or more pattern-based rules to extract an element list for the one or more entities of step 702. In some implementations, server 110 can determine that heuristic-based extraction will be used during a first run (i.e., performance of suitable steps of flow diagram 800), and then pattern-based extraction will be used on one or more subsequent runs. In some implementations, server 110 determines whether to use one or more heuristic rules or one or more pattern-based rules to extract an element list based at least in part on user input. If server 110 determines that one or more heuristic rules are to be used for extraction, server 110 proceeds to steps 704-708, and then returns to step 804. If server 110 determines that one or more pattern-based rules are to be used for extraction, server 110 proceeds to steps 710-712.

Step 806 includes server 110 extracting an element list using one or more heuristic rules. Heuristic rules can include, for example, user-specified patterns for extracting an element list, automatically-generated patterns for extracting an element list, or both. For example, in some implementations, a rendered web page can include a list of episodes of a particular television program. A user can specify a DOM tree path to element nodes for particular episodes of the television program. Accordingly, server 110 can generate an element list by extracting and collecting an identifier for each episode such as an episode title or episode season/number). In a further example, in some implementations, server 110 stores a rendered web page corresponding to each episode of a particular television program, the web page include information about that particular episode. Server 110 can search for a title node for each rendered web page using, for example, a pre-determined keyword search or other heuristic approach, and generate an element list by gathering an identifier for each episode from each web page. For example, server 110 can use an episode title of a television show as an identifier.

Step 808 includes server 110 validating the element list of step 806. In some implementations, server 110 validates, or invalidates, an element list by comparing the element list from a particular host with one or more element lists from one or more other different hosts, e.g., which can be used as one or more reference lists. Elements appearing in more than one element list, for example, can be validated. In some implementations, server 110 validates or invalidates an entire element list if one or more elements do not appear in more than one list. In some implementations, server 110 validates or invalidates a particular element of an element list if the particular element does not appear in more than one list. In some such implementations, server 110 can validate the elements of the element list that do appear in more than one element list. In some implementations, server 110 validates or invalidates more than one element list for an entity, across multiple hosts, at step 808. For example, server 110 can generate element list A and element list B for an entity, and if each element of element list A and each element of element list B appears in both element lists, then server 110 may validate both element list A and element list B for the entity.

Step 810 includes server 110 generating an element list pattern based at least in part on the validation of step 706. In some implementations, the element list pattern generation can be, for example, defined by a DOM tree path from a document root node to an element node. For example, the element list can be derived from a rendered web page, which has been rendered using an HTML template, e.g., during step 404 of flow diagram 400. In some circumstances, the DOM tree path can be the same for the web pages of different entities for a particular host. In some implementations, server 110 also extracts an element title from element node text. For example, server 110 can extract the episode title "Death has a shadow" from the element node text "Season 1 episode 1: Death has a shadow." In some implementations, server 110 aggregates multiple element list patterns generated, for example, for multiple hosts. In some implementations, server 110 may return to step 804, and use the generated element list pattern to extract another element list.

Step 812 includes server 110 extracting an element list using one or more pattern-based rules. In some implementations, the one or more pattern-based rules can be based at least in part on the element list pattern of step 810. In some implementations, the one or more pattern-based rules can be based at least in part on the element list pattern of step 604. For example, server 110 can determine a particular element list pattern for a particular host. The element list pattern can include a tree path for particular element nodes. In some implementations, server 110 uses a DOM tree path determined at step 604 to determine each element of an element list. For example, an element can have a tag path such as "<html><body><li><ul><div>". This tag path describes a path in a DOM tree describing an HTML document, in which <body> refers to the body tag, <li> refers to a list tag, <ul> specifies that the list is unordered, and <div> specifies a section of the body containing the unordered list.

Step 814 includes server 110 validating the element list of step 812. In some implementations, server 110 validates, or invalidates, an element list by comparing the element list from a particular host with one or more element lists from one or more other different hosts, e.g., which can be used as one or more reference lists. Elements appearing in more than one element list can be validated. In some implementations, server 110 validates or invalidates an entire element list if one or more elements do not appear in more than one list. In some implementations, server 110 validates or invalidates a particular element of an element list if the particular element does not appear in more than one list. In some such implementations, server 110 can validate the elements of the element list that do appear in more than one element list. In some implementations, server 110 validates or invalidates more than one element list at step 814. For example, server 110 can generate element list A and element list B, and if each element of element list A and each element list B appears in both element lists, then server 110 may validate both element list A and element list B.

Any of the illustrative steps of flow diagrams 400-800 of FIGS. 4-8 can be omitted, rearranged, combined, or otherwise altered. In some implementations, some of the illustrative steps of flow diagrams 400-800 of FIGS. 4-8 are optional.

Figure 9:
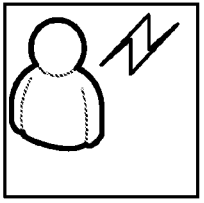
FIG. 9 shows an illustrative web page, having a title tag and other metadata, in accordance with some implementations.

FIG. 9 shows an illustrative web page 900, having a title tag and other metadata, in accordance with some implementations of the present disclosure. Web page 900, having illustrative URL 902 "http://www.wmdb.com/FunnyShow/FS0001/episodes," may include an episode list 910 exhibiting a full list of episodes, an element grouping 920 exhibiting grouped lists of episodes, e.g., by season as illustrated, and a DOM tree viewer 930 exhibiting an HTML arrangement and tree path. It will be understood that web page 900 can have a different layout than that shown in FIG. 9, and that the techniques disclosed herein can be applied to any suitable web page, which can be rendered in any suitable manner.

In some implementations, for example, a particular heuristic rule may include server 110 searching for the text "episode list" within a rendered web page in the title tag, as shown in FIG. 9. If the text is located, using another heuristic rule, server 110 then searches for each element node in the web page, corresponding to each episode, by searching for the text "Episode .*'". Accordingly, server 110 generates an element list based on one or more heuristic rules.

In some implementations, server 110 uses a predetermined tree-path pattern to locate each element in web page 900. For example, server 110 can use a pattern based on element grouping 920 that specifies season number and the arrangement of element nodes. Server 110 can generate an element list by determining an identifier such as an episode title or season/number for each episode. Accordingly, server 110 generates an element list based on one or more pattern-based rules. For example, a DOM tree path such as "<html><body><li><ol><div>" can be used as a pattern. Any suitable pattern having any suitable complexity, such as, for example, a DOM tree path using tags and tag attributes, can be used in accordance with the present disclosure.

Figure 10:
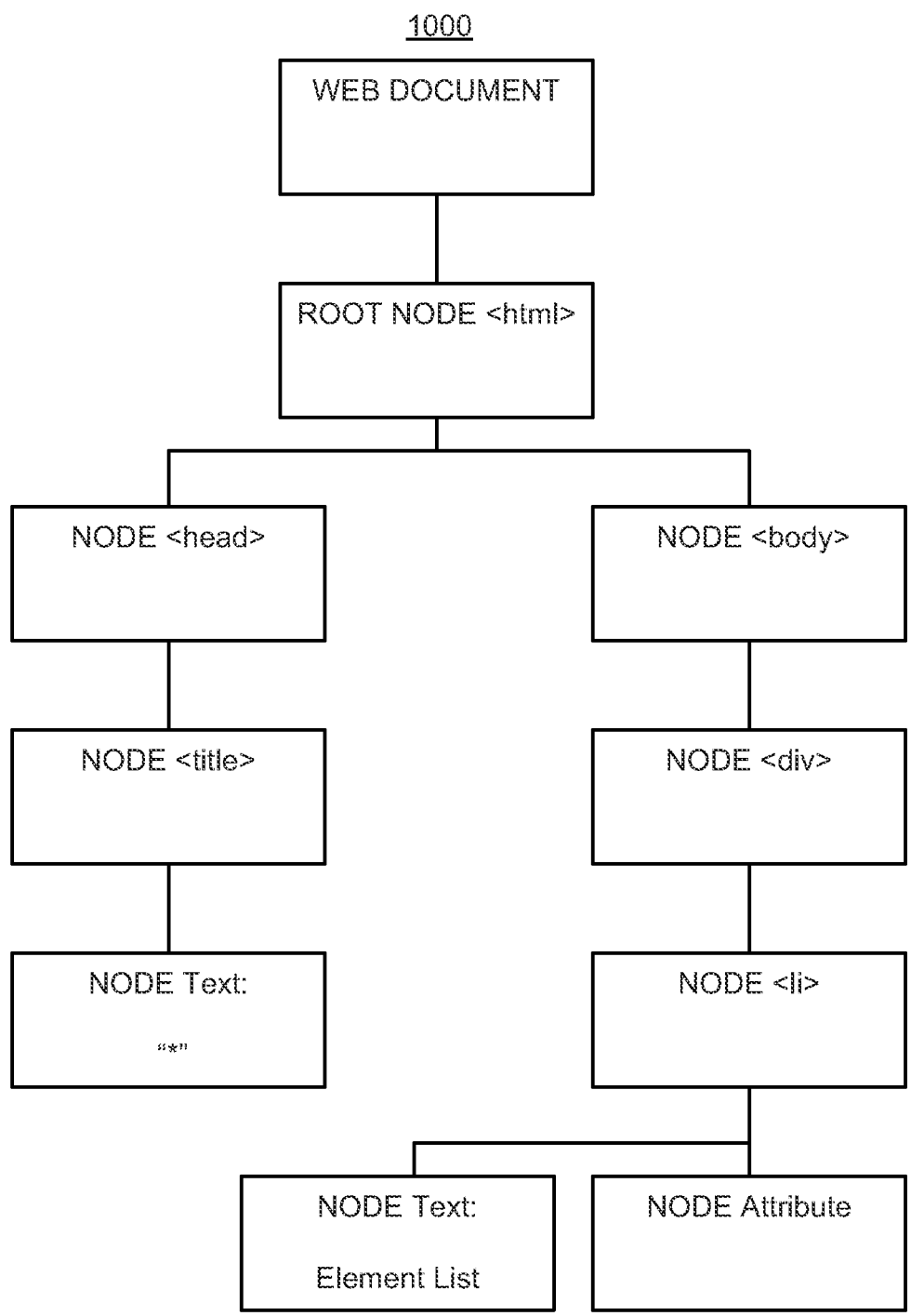
FIG. 10 shows an illustrative document object model (DOM) tree, in accordance with some implementations.

FIG. 10 shows an illustrative DOM tree 1000, in accordance with some implementations. DOM tree 1000 corresponds to a web document having a root node indicating the web document is rendered in <html>. The root node has <head> and <body> child nodes. Descending from the <head> node is a <title> node, which corresponds to an entity such as a music band. Descending from the <title> node is a text node, including the text of the music band name. Descending from the <body> node is a <div> node, indicating a body section of the web document. Descending from the <div> node is a <li> node, indicating an element list such as a song list associated with the music band included in the body section of the web document. Descending from the <li> node are an attribute node and a text node including the list text. Server 110 may use an element list pattern to extract the element list from DOM tree 1000 corresponding to the web document. Web documents from different web pages can include different DOM trees, and accordingly server 110 can use a particular element list pattern for each web page.

The foregoing is merely illustrative of the principles of this disclosure and various modifications may be made by those skilled in the art without departing from the scope of this disclosure. The above described implementations are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method comprising:
accessing, using processing equipment, one or more documents from which to extract structured metadata from each of a plurality of hosts;
extracting, using the processing equipment, a plurality of entity names from one or more documents from a first host of the plurality of hosts using an entity name pattern;
determining whether to extract a first element list based at least in part on one or more heuristic rules or based at least in part on one or more pattern-based rules;
in response to determining to extract the first element list based at least in part on one or more heuristic rules, extracting, using the processing equipment, the first element list from the one or more documents based at least in part on a first entity name of the plurality of entity names and based at least in part on one or more heuristic rules;
validating the first element list based at least in part on a comparison of the first element list with one or more reference lists, wherein the first element list and the one or more reference lists are each associated with a same one of the plurality of entity names;
generating, using the processing equipment, an element list pattern based at least in part on the first element list and on the structured metadata of at least the first host, wherein generating the element list pattern includes determining an element node pattern, wherein the element node pattern is based at least in part on a document object model tree path from a document root node to an element node;
determining whether to extract a second element list based at least in part on one or more heuristic rules or based at least in part on one or more pattern-based rules; and
in response to determining to extract the second element list based at least in part on one or more pattern-based rules, extracting, using the processing equipment, the second element list from the one or more documents based at least in part on a second entity name and one or more pattern-based rules comprising the generated element list pattern.

2. The method of claim 1, further comprising clustering the one or more documents from each of the plurality of hosts.

3. The method of claim 1, further comprising validating the second element list based at least in part on a comparison of the second element list with one or more second reference lists, wherein the second element list and the one or more second reference lists are each associated with the second entity name.

4. The method of claim 1, wherein the one or more documents include one or more web pages, and wherein the accessing the one or more documents includes using a uniform resource locator pattern.

5. The method of claim 4, wherein the one or more web pages include one or more web documents, the method further comprising rendering the one or more web documents.

6. The method of claim 1, wherein extracting the plurality of entity names from the one of more documents includes locating a title tag in the one or more documents.

7. The method of claim 1, further comprising clustering the one or more documents by language.

8. The method of claim 1, wherein the one or more heuristic rules is based at least in part on a user input.

9. A system comprising:
one or more computers configured to:
access, using processing equipment, one or more documents from which to extract structured metadata from each of a plurality of hosts;
extract, using the processing equipment, a plurality of entity names from one or more documents from a first host of the plurality of hosts using an entity name pattern;
determine whether to extract a first element list based at least in part on one or more heuristic rules or based at least in part on one or more pattern-based rules;
in response to the determination to extract the first element list based at least in part on one or more heuristic rules, extract, using the processing equipment, a first element list from the one or more documents based at least in part on a first entity name of the plurality of entity names and based at least in part on one or more heuristic rules;
validate the first element list based at least in part on a comparison of the first element list with one or more reference lists, wherein the first element list and the one or more reference lists are each associated with a same one of the plurality of entity names;

generate, using the processing equipment, an element list pattern based at least in part on the first element list and on the structured metadata of at least the first host, wherein generating the element list pattern includes determining an element node pattern, wherein the element node pattern is based at least in part on a document object model tree path from a document root node to an element node;

determine whether to extract a second element list based at least in part on one or more heuristic rules or based at least in part on one or more pattern-based rules; and in response to determining to extract the second element list based at least in part on one or more pattern-based rules, extract, using the processing equipment, a second element list from the one or more documents based at least in part on a second entity name and one or more pattern-based rules comprising the generated element list pattern.

10. The system of claim 9, wherein the processing equipment is further configured to cluster the one or more documents from each of the plurality of hosts.

11. The system of claim 9, wherein the processing equipment is further configured to validate the second element list based at least in part on a comparison of the second element list with one or more second reference lists, wherein the second element list and the one or more second reference lists are each associated with the second entity name.

12. The system of claim 9, wherein the one or more documents include one or more web pages, and wherein the processing equipment is further configured to use a uniform resource locator pattern.

13. The system of claim 12, wherein the one or more web pages include one or more web documents, and wherein the processing equipment is further configured to render the one or more web documents.

14. The system of claim 9, wherein the processing equipment is further configured to extract the plurality of entity names from the one of more documents by locating a title tag in the one or more documents.

15. The system of claim 9, wherein the processing equipment is further configured to cluster the one or more documents by language.

16. The system of claim 9, further comprising a user interface, wherein the one or more heuristic rules is based at least in part on a user input received by the user interface.

* * * * *